US009831793B2

(12) United States Patent
Oates

(10) Patent No.: US 9,831,793 B2
(45) Date of Patent: Nov. 28, 2017

(54) CONTROL APPARATUS FOR A POWER CONVERTER

(71) Applicant: General Electric Technology GmbH, Baden (CH)

(72) Inventor: Colin Donald Murray Oates, Staffordshire (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 8 days.

(21) Appl. No.: 15/100,620

(22) PCT Filed: Dec. 4, 2014

(86) PCT No.: PCT/EP2014/076635
§ 371 (c)(1),
(2) Date: May 31, 2016

(87) PCT Pub. No.: WO2015/082644
PCT Pub. Date: Jun. 11, 2015

(65) Prior Publication Data
US 2016/0308453 A1 Oct. 20, 2016

(30) Foreign Application Priority Data
Dec. 6, 2013 (EP) .................................... 13275301

(51) Int. Cl.
*H02M 7/48* (2007.01)
*H02M 5/44* (2006.01)
(Continued)

(52) U.S. Cl.
CPC ................ *H02M 5/44* (2013.01); *G05B 7/02* (2013.01); *H02M 1/08* (2013.01); *H02M 2007/4835* (2013.01)

(58) Field of Classification Search
CPC ...... H02M 7/122; H02M 1/32; H02M 3/1584; H02M 3/285; H02M 3/33507;
(Continued)

(56) References Cited

U.S. PATENT DOCUMENTS 4,236,202 A    11/1980  Gaines et al.
5,627,742 A *   5/1997  Nakata ...................... B60L 9/22
                                                    323/235

(Continued)

FOREIGN PATENT DOCUMENTS

CN    102904477    1/2013
CN    202737746    2/2013
(Continued)

OTHER PUBLICATIONS

International Search Report and Written Opinion, PCT/EP014/076635, ALSTOM Technology Ltd, 17 pages (dated Aug. 19, 2015).

(Continued)

*Primary Examiner* — Adolf Berhane
(74) *Attorney, Agent, or Firm* — GE Global Patent Operation; Scott R. Stanley

(57) ABSTRACT

A control apparatus configured to control a chain link voltage source converter, the control apparatus comprising; two converter controllers, each converter controller configured to receive a measure of the output voltage and/or current from the converter and determine a control signal therefrom for controlling the voltage source converter, each converter controller including at least one integrator element configured to perform an integration operation and output an integrator term in said determination of the control signal, a selector configured to select which one of the converter controllers provides its control signal to the converter; wherein each integrator element is configured to have two modes, a first mode in which the integrator element deter-
(Continued)

mines the integrator term and a second mode in which the integrator term is provided by a corresponding integrator element in the other converter controller.

20 Claims, 4 Drawing Sheets

(51) Int. Cl.
    *G05B 7/02*     (2006.01)
    *H02M 1/08*     (2006.01)
    *H02M 7/483*     (2007.01)

(58) Field of Classification Search
    CPC ...... H02M 7/53871; H02M 7/48; H02M 7/49; H02M 1/08; H02M 2007/4835; H02M 2001/0667; H02M 3/158; H02M 3/3155; H02M 3/335; H02M 2001/003; H02M 2001/0012; H02M 2001/0025; H02M 1/12; H02M 1/126
    USPC .................... 363/40, 55, 65, 71, 78, 95, 131
    See application file for complete search history.

(56) References Cited

U.S. PATENT DOCUMENTS

| | | | |
|---|---|---|---|
| 5,642,275 A | | 6/1997 | Peng et al. |
| 7,990,097 B2* | | 8/2011 | Cheng ................. H02M 5/4585 318/800 |
| 2006/0031001 A1 | | 2/2006 | Snowbarger |
| 2013/0106328 A1* | | 5/2013 | Kopiness ................ H02M 1/36 318/400.11 |
| 2013/0128632 A1 | | 5/2013 | Yang et al. |
| 2013/0208519 A1* | | 8/2013 | Yamamoto .............. H02M 7/12 363/67 |
| 2016/0211762 A1* | | 7/2016 | Cheng ................... H02M 7/483 |
| 2016/0308466 A1* | | 10/2016 | Oates .................... H02M 7/797 |

FOREIGN PATENT DOCUMENTS

| | | |
|---|---|---|
| CN | 202840988 | 3/2013 |
| EP | 0 202 603 A2 | 11/1986 |
| EP | 2 362 515 A1 | 8/2011 |
| EP | 2 863 534 | 4/2015 |
| EP | 2 894 778 | 7/2015 |
| GB | 2 519 795 | 5/2015 |
| WO | WO-2008/138911 | 11/2008 |
| WO | WO 2011/107151 A1 | 9/2011 |
| WO | WO-2015/055682 | 4/2015 |
| WO | WO-2015/063179 | 5/2015 |
| WO | WO-2015/104429 | 7/2015 |

OTHER PUBLICATIONS

Fortescue, C.L., "Method of the symmetrical co-ordinates applied to the solution of polyphaser networks," 34th Annual Convention of the American Institute of Electrical Engineers, vol. 37, pp. 1027-1140 (Jun. 28, 1918).

Park, R.H., "Two-reaction theory of synchronous machines," AIEE, vol. 48, pp. 716-730 (Jan. 28-Feb. 1929).

Schauder, C., et al., "Vector analysis and control of advanced static VAR compensators," IEE Proceedings on Generation, Transmission and Distribution, 140(4):8, pp. 266-272.

* cited by examiner

CONTROL APPARATUS FOR A POWER CONVERTER

CROSS-REFERENCE TO RELATED APPLICATIONS

The present application is a National Stage of International Application No. PCT/EP2014/076635, filed Dec. 4, 2014, which claims the benefit of and priority to European Application No. 13275301, filed Dec. 6, 2013, which is incorporated herein by reference in its entirety.

This invention relates to a control apparatus for a power converter for use in a high voltage power transmission network. In particular, it relates to a voltage source converter control apparatus. The invention also relates to a voltage source converter incorporating said control apparatus and a transmission network including at least one of said voltage source converters.

In high voltage direct current (HVDC) power transmission networks alternating current (AC) power is typically converted to direct current (DC) power for transmission via overhead lines and/or under-sea cables. This conversion removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance.

The conversion of DC power to AC power is utilized in power transmission networks where it is necessary to interconnect the DC and AC electrical networks. In any such power transmission network, converters are required at each interface between AC and DC power to effect the required conversion; AC to DC or DC to AC. One such converter is a voltage source converter (VSC). A chain-link converter is a type of voltage source converter.

The control of HVDC systems is complex and it is necessary to introduce redundancy to allow one controller to fail and be repaired offline while another is maintaining service. Switching between controllers when such a fault occurs requires that there is minimum disturbance to the AC and DC voltage waveforms at the instant of the changeover.

According to a first aspect of the invention, there is provided a control apparatus for controlling a chain link voltage source converter, the control apparatus comprising;
two converter controllers, each converter controller configured to receive a measure of the output voltage and/or current from the converter and determine a control signal therefrom for controlling the converter, each converter controller including at least one integrator element configured to perform an integration operation and output an integrator term in said determination of the control signal,
a selector configured to select which one of the converter controllers provides its control signal to the converter;
wherein the or each integrator element is configured to have two modes, a first mode in which the integrator element determines the integrator term and a second mode in which the integrator term is provided by a corresponding integrator element in the other converter controller.

This is advantageous as the integrator elements of the controllers for a chain link voltage source converter can be controlled effectively when switching between controllers using the first and second modes. The two controllers can operate independently to provide the control signal. However the two modes of the integrator elements can be used to provide a smooth transition between controllers as the integrator terms can be transferred between the controllers, at least at the time of switching by the selector. The integrator elements may calculate an accumulation of past error values and therefore, when switching a controller into active service, the integrator element requires an initialisation value representing said past error value from which to calculate a subsequent integrator value. Transferring the integrator terms between integrator elements of the two controllers may provide a steady and reliable initialisation value. Therefore, providing the integrator term of the integration element in one of the controllers for initialising the integrator element of the other controller when switching between the controllers provides an advantageous control apparatus.

Each controller may contain a plurality of integrator elements configured to perform an integration operation and output an integrator term for use in said determination of the control signal, wherein a subset of said integrator elements have said two modes of operation and the remaining integrator element(s) are configured to be initialised with a predetermined integrator term. This is advantageous as although the apparatus may benefit from some of the integrator elements transferring integrator terms between controllers, for others the transfer may add complexity to the system. Therefore, it is advantageous to transfer integrator terms for only some of the integrator elements present in the controllers. Thus, in each controller, at least one of the integrator elements may operate using the first and second modes and at least one other integrator element may operate, initially, using a predetermined integrator term, which may be a fixed value.

Said integrator term(s) may represent an error value comprising a deviation from a set-point and said predetermined integrator term may represent a zero error. Thus, the integrator elements that do not operate using the first and second mode may be configured to calculate their integrator terms using an initialisation value of zero. This may reduce the complexity of the control apparatus.

The apparatus is configured such that on selection of one of the converter controllers by the selector to provide its control signal to the converter, its integrator element(s) may be switched to the first mode from the second mode such that said integrator element(s) initiates its determination of its integrator term using the integrator term provided by the corresponding integrator element in the other converter controller.

The apparatus may be configured such that on de-selection of one of the controllers by the selector, the integrator element(s) of said deselected controller is switched to the second mode. Thus, the inactive controller shadows the operation of the active controller but uses the integrator term of the corresponding integrator element in the active controller.

The selector may be configured to switch the integrator element(s) between the two modes.

Each controller may include one or more of a DC outer loop element for controlling DC power flow, an AC vector control element for determining an AC voltage demand signal using symmetrical sequence analysis and a module selection element for providing a switching signal to the chain link voltage source converter to select or bypass each of a plurality of voltage source modules.

The module selection element may be configured to select the voltage source modules of the power converter to produce the required voltage and, optionally, to maintain the state of charge of capacitors in the modules to be substantially equal within each valve, which comprises a group of modules.

Each controller may include a capacitor balancing control element configured to insert offset current demands into a DC current demand in order to equalise the average capacitor voltage in limb portions of the converter and to set the average of the capacitor voltages to a set point.

The controller may include an AC Vector Control element configured to regulate the AC current through the power converter.

The DC outer loop control element may be configured to regulate the power in the DC system or regulate the DC voltage at terminals of the power converter according to an operator setting.

Each controller may include a power equating element configured to determine an AC power demand and, where the demand may be excessive, limit the DC current demand per phase.

Said subset of integrator elements may comprise one or more of the following;
  i) an integrator element configured to provide a DC voltage control integrator term for DC voltage control in the DC outer loop control element;
  ii) an integrator element configured to provide a DC power control integrator term for DC voltage control in the DC outer loop control element;
  iii) an integrator element configured to provide a AC quadrature term for quadrature control in the AC vector control element;
  iv) an integrator element configured to provide a direct positive sequence term for use in the AC vector control element;
  v) an integrator element configured to provide a quadrature positive sequence term for use in the AC vector control element;
  vi) an integrator element configured to provide a direct negative sequence term for use in the AC vector control element; and
  vii) an integrator element configured to provide a quadrature negative sequence term for use in the AC vector control element.

The positive sequence terms (direct and quadrature) can be considered to describe the power flow through the power converter. The negative sequence terms can be considered to represent imbalance between phases in a multi-phase AC system. It will be appreciated that in some embodiments one of the DC voltage control and the DC power control terms may form part of the subset depending on the network's operational requirements. Further, the AC quadrature term and associated integrator element may be provided by separate elements associated with power control and voltage control.

Said remaining integrator elements, configured to be initialised with a predetermined value, may comprise one or more of the following;
  i) an integrator element configured to provide a direct zero sequence term for use in the AC vector control element;
  ii) an integrator element configured to provide a quadrature zero sequence term for use in the AC vector control element;
  iii) integrator elements configured to provide a collective or "horizontal" capacitor balancing term for use in calculating a capacitor balancing compensation signal for each phase of the converter in the capacitor balancing control element.
  iv) integrator elements configured to provide a differential or "vertical" capacitor balancing term for use in calculating a capacitor balancing compensation signal for each phase of the converter in the capacitor balancing control element.

The zero sequence terms may be ignored in the event the power converter includes a star delta transformer for combining the phases output by the power converter. It will be appreciated that the capacitor balancing control element may include a plurality of integrator elements for use in calculating offset values to balance capacitors in various portions of the power converter. In some embodiments, all of the integrator elements used for capacitor balancing are initialised with a predetermined value, which may be zero.

The control apparatus may include a fault monitoring device for identifying a fault in the controller that supplies the control signal to the converter, the fault monitoring device configured to actuate the selector on identification of a fault to select the other controller.

The integrator element(s) may form part of a proportional-integral (PI) controller or proportional-integral-derivative (PID) controller.

Each controller may include a measurement device for measuring the output of the converter. Alternatively, each controller may receive the measurements of the output of the converter from a common measurement device. The controllers may be configured to measure the AC voltage of the output of the converter. The controllers may be configured to measure the AC current of the output of the converter. The controllers may be configured to measure the DC voltage of the output of the converter. The controllers may be configured to measure the DC current of the output of the converters.

The selector may be configured to connect the output of the module selection element of one of the controllers to the voltage source converter and disconnect the output of the other module selection element of the other controller. Alternatively, the controllers may share a module selection element and the selector may switch which controller provides a voltage demand signal to the shared module selection element.

The first and second mode of the or each integrator element is controlled by an integrator output control comprising a switch configured to switch between the output of the integrator element with which it is associated and the output of the corresponding integrator element in the other controller. The selector may be configured to actuate said switch. The selector may be configured to actuate said switch at the same time it switches control of the converter from one controller to the other controller.

The chain-link converter may comprise at least one converter module, the or each converter module including at least one energy storage device and at least one switch, the or each energy storage device and the or each switch in the or each module combining to selectively provide a voltage source. In this manner the or each switch controls whether the or each energy storage device is bypassed or connected to a converter circuit which provides the output voltage. A module selection element may be present for switching the or each converter module to control the output voltage of the VSC, wherein the control signal is provided to the module selection element. In particular, the module selection element may provide a switching signal configured to control whether the or each converter module is connected or bypassed.

According to a second aspect of the invention there is provided a voltage source converter of chain link type including the control apparatus of the first aspect.

According to a third aspect of the invention there is provided a power transmission network including the voltage source converter of the second aspect.

According to a fourth aspect of the invention we provide a method of operating a control apparatus for controlling a chain link voltage source converter, the control apparatus comprising two converter controllers, the method comprising receiving by each converter controller a measure of the output voltage and/or current from the converter and determining a control signal therefrom for controlling the voltage source converter, performing an integration operation at each converter controller and outputting an integrator term for said determination of the control signal, selecting which one of the converter controllers provides its control signal to the converter;

providing a first mode in which the integration operation is performed using the integrator term from the particular converter controller and a second mode in which the integrator term is provided by the other converter controller.

There now follows a brief description of a preferred embodiment of the invention, by way of a non-limiting example, with reference to the following figures in which.

Figure 1:
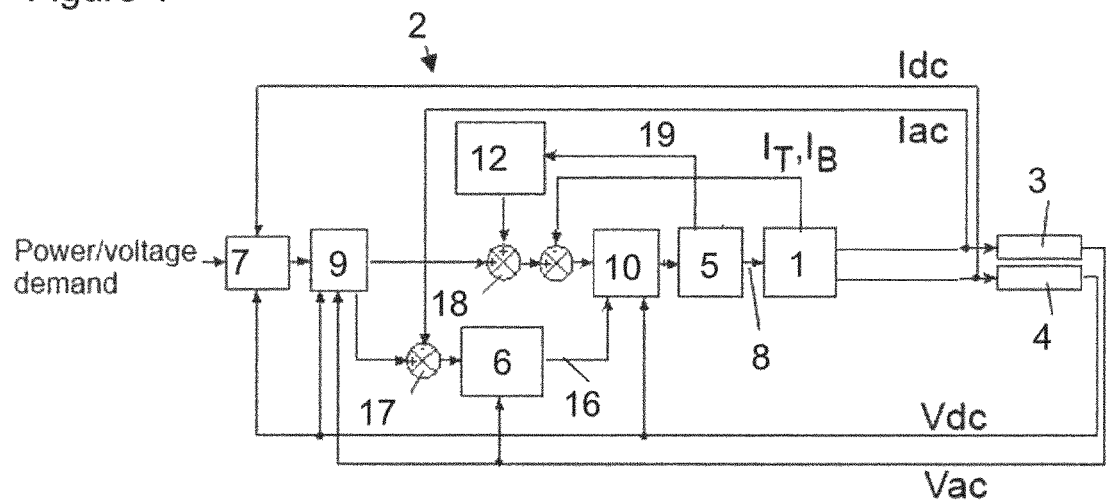
FIG. 1 shows a schematic view of the general layout of a controller.

FIG. 1 shows a schematic diagram of a power converter and its associated controller. The power converter 1 provides conversion of power between an AC power network or system 3 and a DC power network or system 4. In this example, the power converter 1 comprises a voltage source converter (VSC) of chain-link converter type. The controller 2 may be integrated with the VSC 1. The VSC 1 includes a plurality of converter modules and typically includes several hundred converter modules. Each converter module may include switches connected in parallel with a capacitor. In this manner the switches control whether the capacitor is bypassed or connected to a converter circuit which provides the output voltage to the network 3,4. The VSC 1 is able to build up a combined voltage across the chain-link converter, which is higher than the voltage available from each of its individual converter modules, via the insertion of capacitors of multiple converter modules, each providing its own voltage, into the chain-link converter. In this manner switching of the switches in each converter module causes the chain-link converter to provide a stepped variable voltage source, which permits the generation of a voltage waveform across the chain-link converter using a step-wise approximation. As such the chain-link converter is capable of providing a wide range of complex voltage waveforms.

Figure 7:
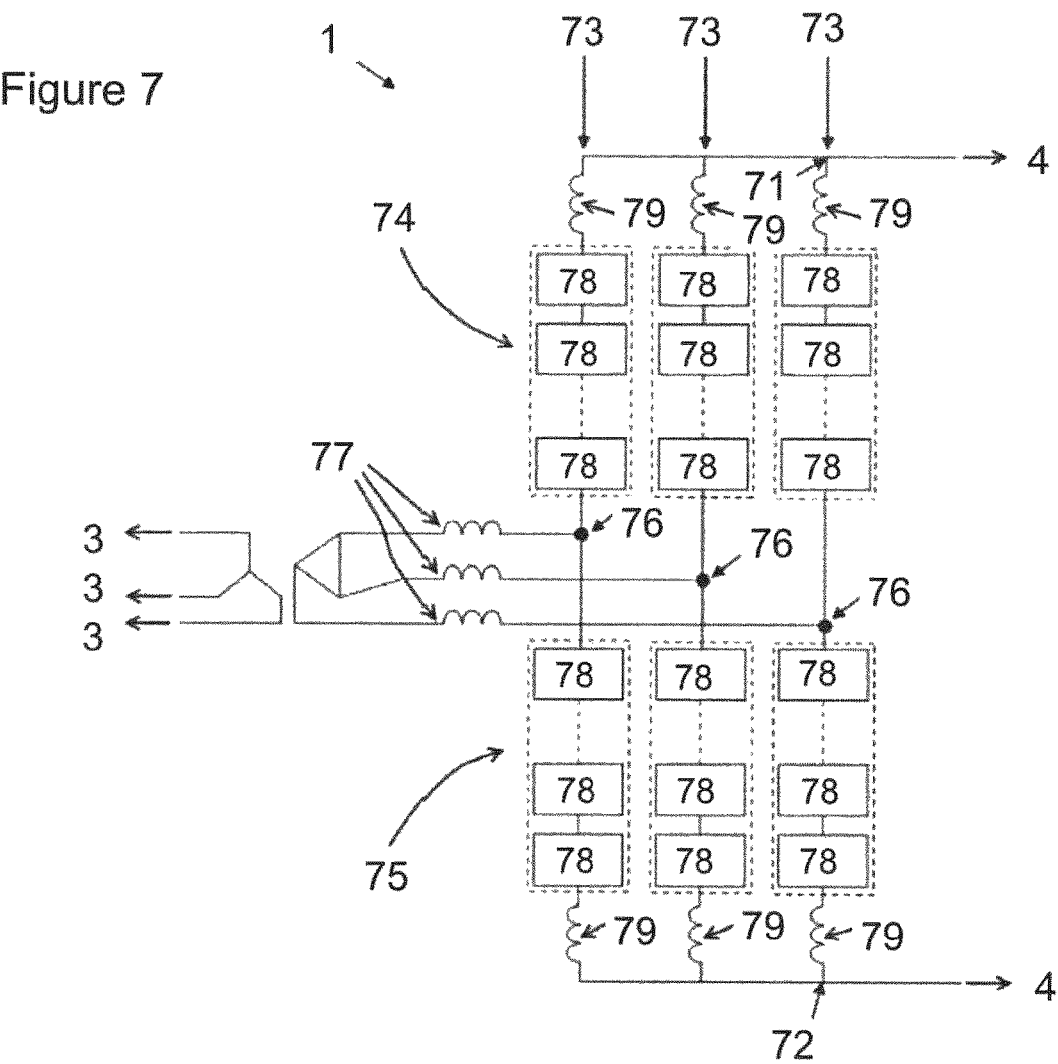
FIG. 7 shows, in schematic form, an example voltage source converter.
Figure 8:
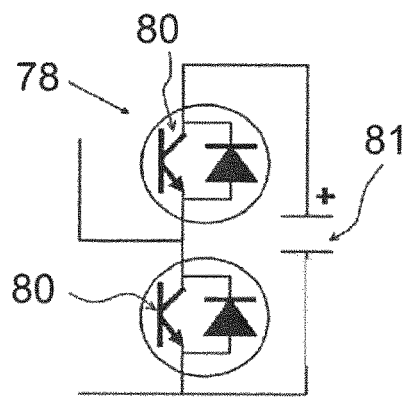
FIG. 8 shows, in schematic form, a module of the voltage source converter of FIG. 7.

FIGS. 7 and 8 show an example construction of the VCS 1.

The voltage source converter 1 comprises first and second DC terminals 71,72 and three converter limbs 73. Each converter limb 73 extends between the first and second DC terminals 71,72. Each converter limb 73 includes first and second limb portions 74,75 separated by a respective AC terminal 76.

In use, the first and second DC terminals 71,72 are respectively connected to positive and negative poles of the DC electrical network 4, while each AC terminal 76 is connected to a respective phase of a three-phase AC electrical network 3. More particularly, in the case of the latter, the AC terminals 76 of the voltage source converter 1 are connected to the AC electrical network 3 via a star-delta transformer that includes mutually coupled star-connected and delta-connected windings. Each AC terminal is connected to a respective corner of the delta-connected winding, and so the star-delta transformer presents a respective series reactance (which is shown as an inductor 77 in FIG. 7) to each AC terminal.

Each limb portion 74,75 includes a plurality of series-connected modules 78 connected in series with a limb inductor 79. Each module 78 includes a pair of active switching elements 80 and an energy storage device in the form of a capacitor 81. The pair of active switching elements 80 is connected in parallel with the capacitor 81 in a half-bridge arrangement, as shown in FIG. 8.

Each active switching element 80 constitutes an insulated gate bipolar transistor (IGBT), which is connected in parallel with an anti-parallel passive current check element in the form of a diode. It is envisaged that, in other embodiments of the invention, each active switching element may be replaced by a plurality of active switching elements, e.g. a plurality of series-connected active switching elements. It is further envisaged that, in other embodiments of the invention, each IGBT may be replaced by another type of active switching element, for example, a metal-oxide-semiconductor field-effect transistor, a gate turn-off thyristor or an integrated gate-commutated thyristor. It is envisaged that, in other embodiments of the invention, each passive current check element of each first switching element may be replaced by a plurality of passive current check elements, e.g. a plurality of series-connected passive current check elements. It is envisaged that, in other embodiments of the invention, each capacitor 81 may be replaced by another type of energy storage device that is capable of storing and releasing energy, e.g. a fuel cell or battery.

In each limb portion 74,75, the plurality of series-connected modules 78 defines a valve, and the operation of each module 78 in each valve is described as follows.

The capacitor 81 of the module 78 is selectively bypassed or inserted into the valve by changing the states of the IGBTs. This selectively directs current through the capacitor 81 or causes current to bypass the capacitor 81, so that the module 78 provides a zero or positive voltage.

The capacitor 81 of the module 78 is bypassed when the IGBTs are configured to form a short circuit that bypasses the capacitor 81. This causes current in the valve to pass through the short circuit and bypass the capacitor 81, and so the module 78 provides a zero voltage, i.e. the module 78 is configured in a bypassed mode.

The capacitor 81 of the module 78 is inserted into the valve when the IGBTs are configured to allow the current in the valve to flow into and out of the capacitor 81. The capacitor 81 then charges or discharges its stored energy so as to provide a non-zero voltage, i.e. the module 78 is configured in a non-bypassed mode.

In this manner the IGBTs are connected in parallel with the capacitor 81 in a half-bridge arrangement to define a 2-quadrant unipolar module 78 that can provide zero or positive voltage and can conduct current in two directions, and so each module 78 is capable of selectively providing a voltage source.

In other embodiments of the invention, it is envisaged that each module may be replaced by another type of module that includes at least one switching element and at least one energy storage device, whereby the or each switching element and the or each energy storage device in the or each module combines to selectively provide a voltage source.

It is possible to build up a combined voltage across the valve, which is higher than the voltage available from each of its individual modules 78 via the insertion of the capacitors 81 of multiple modules 78, each providing its own voltage, into the valve. In this manner switching of the IGBTs in each module 78 causes the valve to provide a stepped variable voltage source, which permits the generation of a voltage waveform across the valve using a step-wise approximation. As such each valve is capable of providing a wide range of complex voltage waveforms.

The voltage source converter 1 is controlled by the controller 2, and, in particular, by a module selection element 5 of the controller 2 configured to control switching of the switching elements 80 in each module 78 of each limb portion 74,75. More particularly, the controller 2 is configured to generate a respective valve voltage demand $V_T, V_B$ for each valve which is used by the module selection element to generate a module switch instruction set to control switching of the switching elements 80 in each module 78 of each limb portion 74,75 in accordance with the respective valve voltage demand $V_T, V_B$ for each valve.

In use, the voltage source converter 1 is operable to transfer power between the AC and DC electrical networks 3,4 through switching of the switching elements 80 in each module 78 so as to selectively operate each limb portion 74,75 as a respective discrete controlled voltage source between the AC and DC terminals 76,71,72 over an operating cycle of the voltage source converter 1. Operating a limb portion as a discrete controlled voltage source between the corresponding AC and DC terminals 76,71,72 enables the limb portion 74,75 to be further operated to control the configuration of a voltage at the respective terminal 76,71,72. For example, the switching elements 80 in each module 78 can be switched to selectively provide a voltage source to "pull down" (subtract voltage steps from) a DC voltage at the respective DC terminal 71,72 to control the configuration of an AC voltage at the AC terminal 76. Such switching of the switching elements 80 in each module 78 of each limb portion 74,75 is carried out in accordance with the respective valve voltage demand $V_T, V_B$ for each valve.

In order for the voltage source converter 1 to exchange power with the AC and DC electrical networks 3,4 and thereby cause transfer of power between the AC and DC electrical networks 3,4, the controller 2 and module selection element 5 controls the operation of the voltage source converter 1 in accordance with AC and DC voltage demands and alternating and direct current demands.

In use, the DC electrical network 4 is operated within or up to a predefined rated DC voltage Vdc and the AC electrical network 3 is operated within or up to a predefined rated AC voltage Vac. The AC and DC output voltage demands for the voltage source converter 1 respectively correspond to the AC voltage of the AC electrical network 3 and the DC voltage of the DC electrical network 4.

FIG. 1 shows, in schematic form, a layout of an example of the controller 2.

The controller 2 includes a DC outer loop control element 7, a power equating control element 9, a plurality of valve voltage demand sub-controllers 10, a AC vector control element 6, and a capacitor balancing control element 12. Each of the plurality of valve voltage demand sub-controllers 10 is associated with a respective one of the valves. For the purposes of simplicity, FIG. 1 shows only one of the plurality of valve voltage demand sub-controllers 10.

FIG. 1 further shows, in schematic form, the use of limb portion (74 and 75) currents $I_T, I_B$ and alternating and direct currents Iac, Idc, (which may be derived by a sum-difference control element—not shown) whereby the alternating current Iac flows at the AC terminal 76 of the converter limb 73, and the direct current Idc flows at the first and second DC terminals 71,72 of the converter limb 73.

The DC outer loop control element 7 is configured to receive a power demand and the AC and DC output voltage demands. The DC outer loop control element 7 is configured to receive a measured direct current Idc and a measured DC voltage Vdc of the DC electrical network 4.

The DC outer loop control element 7 regulates the DC power flow of the voltage source converter 1 (or regulates the DC voltage Vdc across the first and second DC terminals 71,72), and provides information to the power equating control element 9, whereby the information consists of the power demand, the AC and DC output voltage demands, a direct current demand, the measured direct current Idc and DC voltage Vdc of the DC electrical network 4.

The power equating control element 9 generates a direct current demand based on the AC and DC output voltage demands and based on a balancing of an AC power exchanged between the voltage source converter 1 and the AC electrical network 3 and a DC power exchanged between the voltage source converter 1 and the DC electrical network 4. The power equating control element 9 scales the direct current demand received from the DC outer loop control element 7 to create an equivalent alternating current demand. The power equating control element 9 is configured to limit both alternating and direct current demands if excessive power is being demanded.

The controller 2 further includes alternating and direct current signal comparison elements 17,18.

The alternating current signal comparison element 17, which in the embodiment shown is depicted as a difference junction, compares the alternating current demand (as provided by the power equating control element 9) with a measured alternating current Iac flowing between the voltage source converter 1 and the AC electrical network 3 so as to generate a modified alternating current demand, which is subsequently provided to the AC vector control element 6.

The direct current signal comparison element 18, which in the embodiment shown is depicted as a summing junction, modifies the direct current demand (as provided by the power equating control element) based on a capacitor balancing compensation signal from the capacitor balancing control element 12, and the direct current demand is subsequently provided to the valve voltage demand sub-controller 10. The capacitor balancing control element 12 is configured to receive an average voltage level 19 of the plurality of capacitors 81 in each limb portion 74,75 from the module selection element 5, and to process the received average voltage levels 19 to generate a capacitor balancing compensation signal. The capacitor balancing compensation signal may be configured in various ways to enable modification of the direct current demand from the power equating control element 9.

The AC vector control element 6 is configured to process the modified alternating current demand to provide an AC voltage demand signal. The AC vector control element 6 is further configured to provide the AC voltage demand signal to the valve voltage demand sub-controller 10.

For a given level of transfer of power between the voltage source converter 1 and the AC electrical network 3, the provision of the AC output voltage demand signal by the AC vector control element 6 enables control over an alternating current Iac flowing between the voltage source converter 1 and the AC electrical network 3. More particularly, the AC vector control element 6 controls the alternating current Iac by manipulating the AC voltage phase and magnitude. As such the AC vector control element 6 regulates the AC power flow of the voltage source converter 1.

The valve voltage demand sub-controller 10 is configured to generate the respective valve voltage demand $V_T, V_B$ for each valve. The use of the respective limb portion current $I_T, I_B$ as feedback allows the valve voltage demand sub-controller 10 to function as a feedback deadbeat control and thereby enhances control over the operation of the voltage source converter 1 to transfer power between the AC and DC electrical networks 3, 4 while having minimal effect on the bandwidths of the other cascaded components 7,9,6,12 of the controller 2 that are configured to provide the demands to the valve voltage demand sub-controller 10.

The respective valve voltage demand $V_T, V_B$ for each valve is provided to the module selection element 5. The element 5 then selects, by way of switching instructions 8, the modules 78 required to be in the non-bypassed mode in order to enable generation of a voltage across the valve to meet the valve voltage demand $V_T, V_B$.

Preferably the module selection element 5 is configured to select the modules 78 required to be in the non-bypassed mode so as to enable balancing of the energy levels of the capacitors 81 of the plurality of modules 78 in each valve.

In respect of each limb portion 74,75, the module selection element 5 is configured to control switching of the switching elements 80 of each module 78 in order to meet the respective valve voltage demand $V_T, V_B$. Control of the modules 78 thereby causes transfer of power between the AC and DC electrical networks 3, 4.

In summary, the controller 2 samples the measurements of the output of the VSC 1 and processes this information to determine a demand signal for the module selection element 5. The derivation of the demand signal from the VSC output measurements involves the calculation of a plurality of internal control terms in the DC outer loop control 7, power equating element 9, AC vector control element 6, capacitor power balancing control element 12 and valve voltage sub-controller 10. The internal control terms may be determined by integration and therefore the controller uses a historical value or values in combination with the present value to form the particular internal control term. The control terms may comprise sub-steps in the calculation of the control signal provided to the module selection element 5 or are for use in calculating modifiers of the control signal as it is derived in the cascaded controller.

Figure 2:
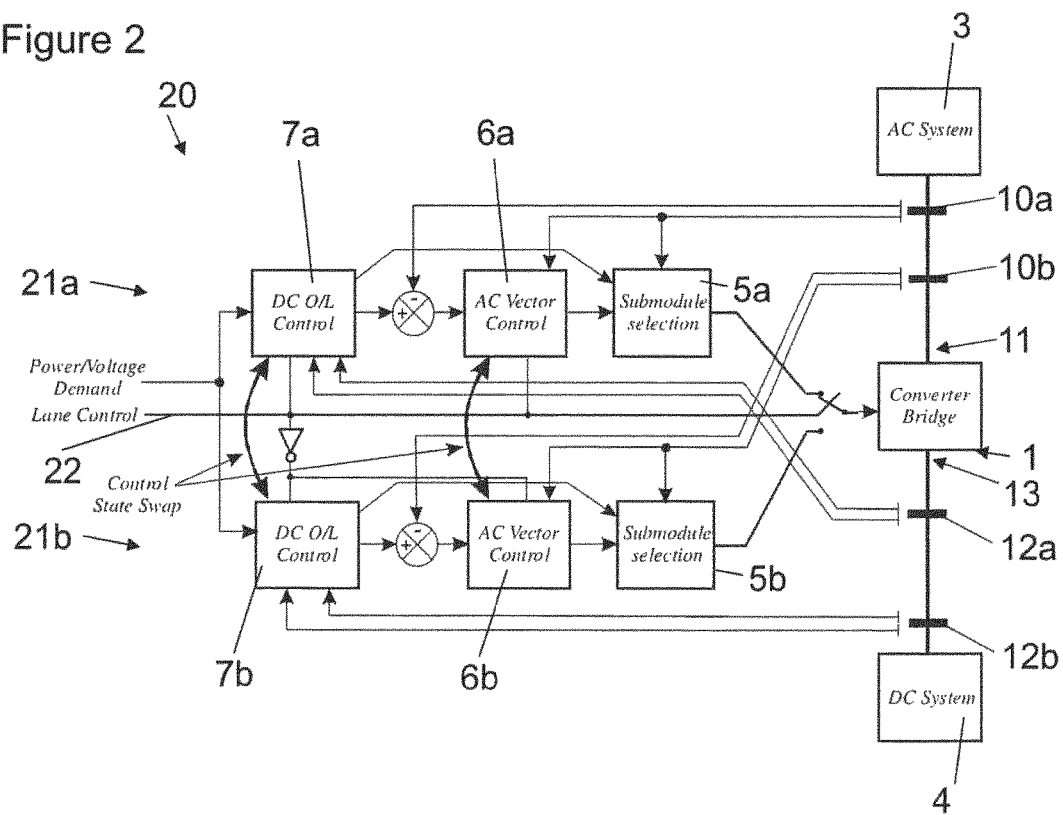
FIG. 2 shows a simplified schematic view of an example structure of a control apparatus having two converter controllers according to the invention.

FIG. 2 shows a control apparatus 20 having two controllers; a first controller 21a and a second controller 21b. The controllers 21a and 21b are each of the same layout as the controller 2, however, in FIG. 2, a simplified version of the controller is shown. In particular, only the DC outer loop controls 7a,7b, AC vector control element 6a, 6b and module selection elements 5a,5b are shown. The same reference numerals have been used where appropriate with "a" and "b" suffices to show which controller the parts are associated with. The suffix "a" denoting the upper controller and "b" the lower controller, as represented schematically in FIG. 2. The first and second controllers 21a, 21b can independently control the VSC 1. The provision of two controllers provides redundancy in the control apparatus 20 such that in the event that one of the controllers 21a, 21b fails, the control apparatus can switch such that the other controller controls the VSC 1.

The first and second controllers 21a, 21b each include a module selection element 5a, 5b, an AC vector control element 6a, 6b and a DC outer loop control element 7a, 7b. It will be appreciated that the controllers 21a and 21b may be arranged to provide the AC or DC voltage demand signal to a shared module selection element.

The first controller 21a includes an AC output measurement device 10a configured to measure the AC current and the AC voltage at the AC terminal 11 of the VSC 1. The first controller 21a also includes a DC output measurement device 12a configured to measure the DC current and the DC voltage at a DC terminal 13 of the VSC 1. Likewise, the second controller 21b includes an AC output measurement device 10b configured to measure the AC current and the AC voltage at the AC terminal 11 of the VSC 1. The second controller 21b also includes a DC output measurement device 12b configured to measure the DC current and the DC voltage at a DC terminal 13 of the VSC 1. It will be appreciated that the first and second controllers 21a and 21b could be configured to receive the measurements of AC and DC voltage and current from the same measurement devices. Thus, a single AC output measurement device may measure the AC voltage and current and supply the measurements to both controllers 21a, 21b, and a single DC output measurement device may measure the DC voltage and current and supply the measurements to both controllers 21a, 21b.

The control apparatus 20 also includes a selector 22 for switching control of the VSC 1 between the first and second controllers 21a, 21b. The selector 22 may be actuated by a fault monitoring system configured to identify faults with the control of the VSC 1. The selector 22 is configured to control whether the output of the first module selection element 5a is connected to the VCS 1 or whether the output of the second module selection element 5b is connected to the VCS 1. The selector also manages a handover of internal control terms between the first controller 21a and the second controller 21b at switchover so as to manage the disruption to the output of the VSC 1 during switching between controllers 21a, 21b.

The controllers 21a and 21b utilise integrator elements in the derivation of the DC and AC voltage demand signal which is supplied to the module selection element 5. The integrator elements integrate an integrator input signal over time to provide an integrator output signal, which is used by the controllers 21a and 21b in their determination of the ultimate output, the AC or DC voltage demand value, that is supplied to the module selection element 5 for selection of the modules 78.

In particular, controllers 21a and 21b may include PID (proportional-integral-derivative) or PI (proportional-integral) controllers that include the integrator elements. When a controller is operating correctly the difference between the voltage demand value for the control and the measured output voltage should be driven to zero. Accordingly, control terms relating to proportional and differential elements of the controllers settle to zero and the control term from the integrator element settles to some finite value. In one configuration, the non-operational controller, say 21b, may shadow the operation of the operational controller 21a and therefore controller 21b will determine its own voltage demand and internal control terms but the voltage demand from the operational controller 21a will be controlling the VSC 1. Thus, particularly where separate measurement devices 10a, 10b, 12a, 12b are involved (to measure the AC voltage, AC current, DC voltage and DC current output from the VSC 1), the error tolerance of the measurement devices is such that there will be a finite error in the control terms of the non-operational controller 21b which will cause the differential terms to give zero output, but the proportional terms may have a finite, non-zero output and the integrator terms may ramp to infinity.

When the controller apparatus switches to the controller 21b, the integrator elements of the controller 21b may initially produce erroneous or inconsistent values until the integrator elements have integrated over sufficient data to settle to a steady state. This can cause disruption to the output voltage/current of the VSC 1 at the time of and after switching, which is undesirable. The management of the internal integrator terms associated with the integrator elements is therefore advantageous.

Figure 3:
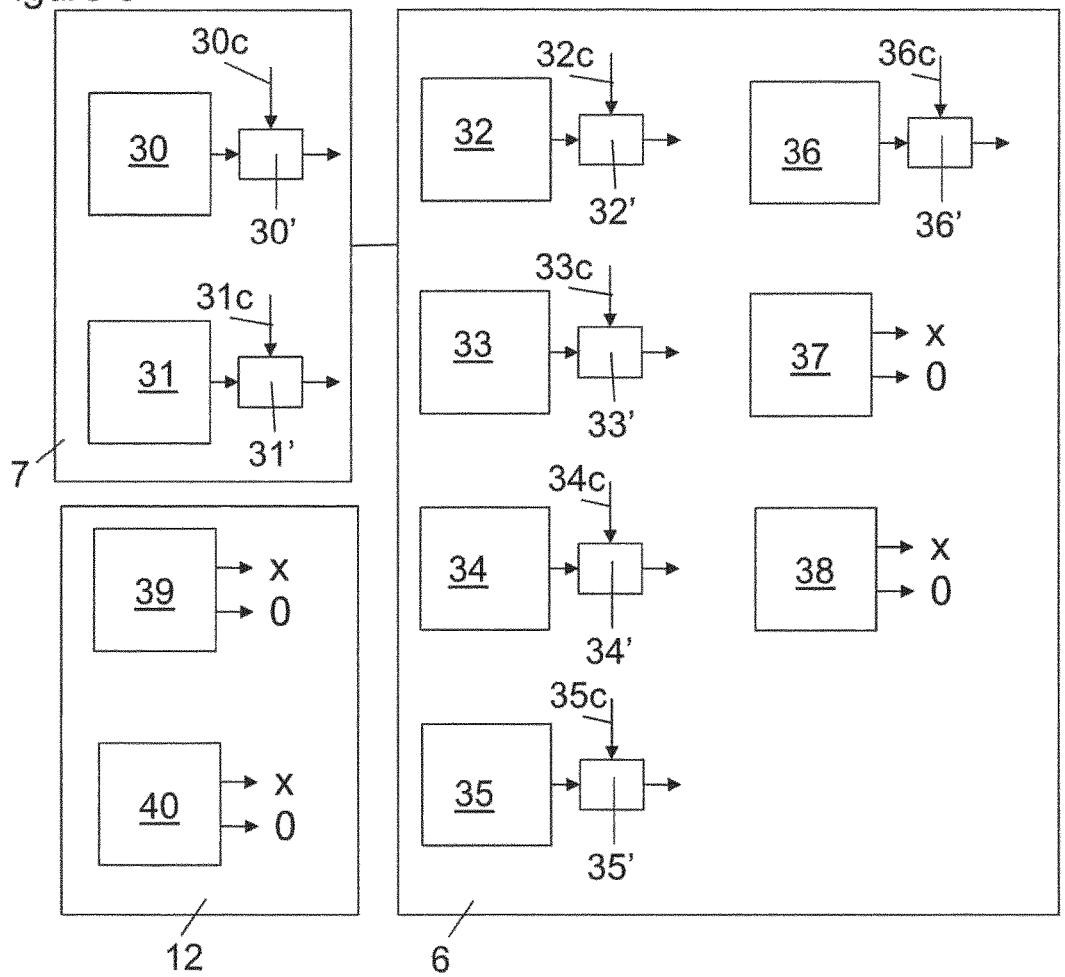
FIG. 3 shows a diagram of a plurality of integration elements in each controller the control apparatus.

With reference to FIG. 3, the controllers 21a, 21b of the chain link converter VCS 1 utilises several integrator elements. In particular, the following integrator elements may be present;

i) an integrator element 30 providing a DC power term for DC power control in the DC outer loop control element 7;
ii) an integrator element 31 providing a DC voltage term for DC voltage control in the DC outer loop control element 7;
iii) an integrator element 32 providing a AC quadrature term for quadrature power and/or voltage control in the AC vector control element 6;
iv) an integrator element 33 providing a direct positive sequence term for use in the AC vector control element 6;
v) an integrator element 34 providing a quadrature positive sequence term for use in the AC vector control element 6;
vi) an integrator element 35 providing a direct negative sequence term for use in the AC vector control element 6;
vii) an integrator element 36 providing a quadrature negative sequence term for use in the AC vector control element 6;
viii) an integrator element 37 providing a direct zero sequence term for use in the AC vector control element 6;
ix) an integrator element 38 providing a quadrature zero sequence term for use in the AC vector control element 6;
x) an integrator element 39 providing a "collective" or "horizontal" capacitor balancing term for use in calculating a capacitor balancing compensation signal to set capacitor energy levels to a predetermined value within the converter in the capacitor balancing control element 12;
xi) an integrator element 40 providing a "differential" or "vertical" capacitor balancing term for use in calculating a capacitor balancing compensation signal to balance energy levels of subsets of capacitors within the converter, in the capacitor balancing control element 12.

The selector 22 is further configured to control the integrator elements 30-40 or, advantageously, a subset of the integrator elements. The integrator elements of a controller that has just been switched into operation may be controlled by setting the associated integrator terms to that of corresponding integrator terms generated by the other controller. Further, the integrator terms of the integrator elements of the non-operational controller may be set to match those of the operational controller. Thus, when switching occurs, the integrator terms of the integrator elements of the now operational controller have not drifted to an erroneous state and instead provide a steady VSC output waveform.

It has been surprisingly found that the integrator output controls may not be necessary for particular integrator elements. If only a subset of the integrator elements require integrator output controls, the complexity of the apparatus can be reduced. It will be appreciated that the subset may comprise different integrator elements depending on application. In particular, it has been determined that transfer of integrator terms for integrator elements 39 and 40, namely those used in the capacitor balancing control element 12, may not be required. Further, the integrator terms for the zero sequence terms in the AC vector control element 6, i.e. integrator elements 37 and 38, may not be required. Use of a star delta transformer in the VSC may mean that the zero sequence terms (direct and quadrature) can be ignored. Instead, the integrator terms for those integrator elements 37 to 40 may be configured such that they are set to zero (or other predetermined value) when their controller is the non-active controller.

Accordingly, each integrator element may include an integrator output control 30' to 36'. The integrator output control is used to control the output of its associated integrator element. The integrator output controls have a first mode in which the integrator term output by the integrator element is calculated by the integrator element itself and a second mode in which the integrator term output by the integrator element is determined by the corresponding integrator element in the other controller. Control lines 30c to 36c are shown which transfer the corresponding integrator term from the other controller in to the integrator output control of the current integrator element. The selector 22 may be configured to switch the integrator output controls between the first and second modes. The selector 22 may switch the integrator output control at the same time it selects which module selection element 5a or 5b is connected to the VSC 1 or it may perform the switching at different times.

Accordingly, FIG. 3 shows integrator output controls 30' to 36' associated with integrator elements 30 to 36 respectively, which form a subset of the integrator elements present in each controller. The remaining integrator elements 37 to 40 do not have an associated integrator output control and instead are configured to initialise, when the associated controller is switched to active, with an integrator term of zero (or other default value). FIG. 3 shows the two possible outputs of integration elements 37 to 40 as x, representing the integration term calculated by the integration element 37 to 40, or zero, the default initialisation value. The selector may be configured to control the integrator elements 37 to 40 such that they adopt a zero value when their associated controller is not the active controller.

Figure 4:
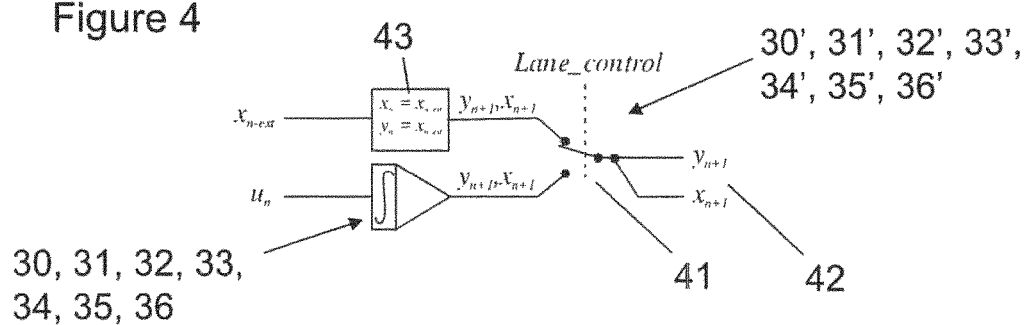
FIG. 4 shows a diagram of an integrator output control.

FIG. 4 shows a diagram of an integrator element 30 to 36 and associated integrator output control 30' to 36'. Each integrator output control includes a switch 41 that controls the source of the integrator term at an output 42. As discussed above, the switch 41 has a first mode and a second mode. In the first mode, the switch connects the output 42 to the integrator element 30 to 36. The integrator term $y_{n+1}$ is calculated by integration using an internal state value $x_{n+1}$ and an input $u_n$. In the second mode, the switch 41 connects the output 42 such that it is connected to the corresponding integrator element, designated 43, in the other controller. The integrator term $y_{n+1}$ and the state value $x_{n+1}$ is set to that of the corresponding integrator element of the other controller $x_{n-ext}$. The switch 41 may be controlled by the selector 22. The integrator elements 30 to 36 may use any appropriate form of integration, for example, Euler integration or Trapezoidal integration to form the integrator term.

Figure 5:
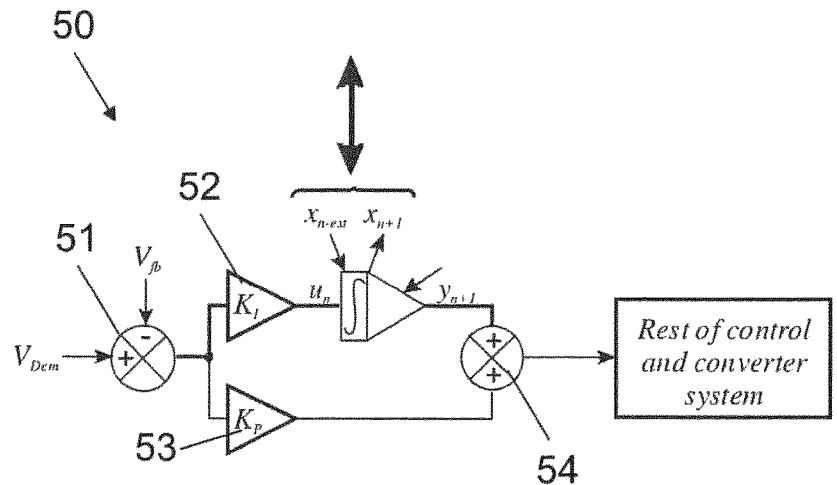
FIG. 5 shows an integration element supplying an integration term to a corresponding integration element in the other controller.

FIG. 5 shows a proportional integral (PI) controller 50 of which the integrator element 30 to 40 is part. The PI controller is of typical design having a comparator 51 that receives a voltage demand $V_{Dem}$ and the measured voltage output $V_{fb}$ that comprises a feedback value, an integral gain 52, a proportional gain 53 and a mixer 54. The integrator element 30 to 36 however includes means to exchange its integrator term with the corresponding integrator element 30 to 36 in the other controller, as shown by the receipt of $x_{n-ext}$ and output of $x_{n+1}$. It will be appreciated that only the integrator elements that exchange integrator terms may be configured to include the connection for outputting their term for a corresponding integrator element.

The operation of the control apparatus 1 will be described based on the first controller 21a initially being the active controller and the selector 22 causing the control of VSC 1 to be handed over to the second controller 21b. However, it will be appreciated that the control apparatus could equally switch from the second controller 21b to the first controller 21a.

The first controller 21a, being the currently active controller, will supply the VSC 1 with control signals from the module selection element 5a.

The integrator element 30a of the first controller 21a provides a DC power control integrator term for DC power control in the DC outer loop control element 7a and also for supplying to the corresponding integrator element 30b of the second controller 21b.

The integrator element 31a of the first controller 21a provides a DC voltage control integrator term for DC voltage control in the DC outer loop control element 7a and also for supplying to the corresponding integrator element 31b of the second controller 21b.

The integrator element 32a of the first controller 21a provides an AC quadrature power term for quadrature power control in the AC vector control element 6 and also for supplying to the corresponding integrator element 32b of the second controller 21b.

The integrator element 33a of the first controller 21a provides a direct positive sequence control integrator term for use in the AC vector control element 6a and also for supplying to the corresponding integrator element 33b of the second controller 21b.

The integrator element 34a of the first controller 21a provides a quadrature positive sequence control integrator term for use in the AC vector control element 6a and also for supplying to the corresponding integrator element 34b of the second controller 21b.

The integrator element 35a of the first controller 21a provides a direct negative sequence integrator term for use in the AC vector control element 6a and also for supplying to the corresponding integrator element 35b of the second controller 21b.

The integrator element 36a of the first controller 21a provides a quadrature negative sequence control integrator term for use in the AC vector control element 6a and also for supplying to the corresponding integrator element 36b of the second controller 21b.

The integrator elements 37a to 40a of the first controller 21a provide their respective integrator terms for use in the calculation of the instructions supplied to the module selection element 5a. The integrator elements 37a to 40a do not supply their calculated values to the other controller 21b.

The selector 22, as well as switching between the controllers 21a, 21b, provides a link to transfer the above integrator terms to the corresponding integrator elements of controller 21b. The switches 41 of each of the integrator elements 30b to 36b of the second controller 21b are in the second mode such that their integrator terms are determined by the integrator terms supplied by the integrator elements 30a to 36a of the first controller 21a.

The integrator elements 37b to 40b are configured such that their integrator terms are set to zero.

In the event of a fault or for any other reason, the selector 22 may be actuated to transfer control of the VSC 1 to the second controller 21b. Accordingly, on actuation, module selection element 5a of the first controller is disconnected from the VSC 1 and the module selection element 5b of the second controller is connected to the VSC 1.

The integrator elements 37b to 40b in the second controller 21b therefore begin active operation with their integrator terms set at zero.

The actuation of the selector 22, causes the switches 41 of each of the integrator elements 30b to 36b of the second controller 21b to adopt the first mode. In the first mode, the integrator elements actively calculate and output their respective integrator terms. However, the initial state of said integrator elements 30b to 36b will be determined by the integrator terms that were received from the integrator elements 30a to 36a of the first controller 21a just before actuation of the selector 22. This results in a stable handover of control between the first and second controllers 21a, 21b.

Further, the actuation of the selector 22 causes the switches 41 of each of the integrator elements 30a to 36a of the first controller 21a to adopt the second mode. Thus, the integrator terms of the integrator elements 30a to 36a of the first controller 21a are determined by the integrator terms supplied by the integrator elements 30b to 36b of the second controller 21b.

Accordingly, the first controller 21a is provided with integrator terms by the second controller 21b so that when it is selected to be the active controller by the selector 22, its integrator elements can handle the transition smoothly.

Figure 6:
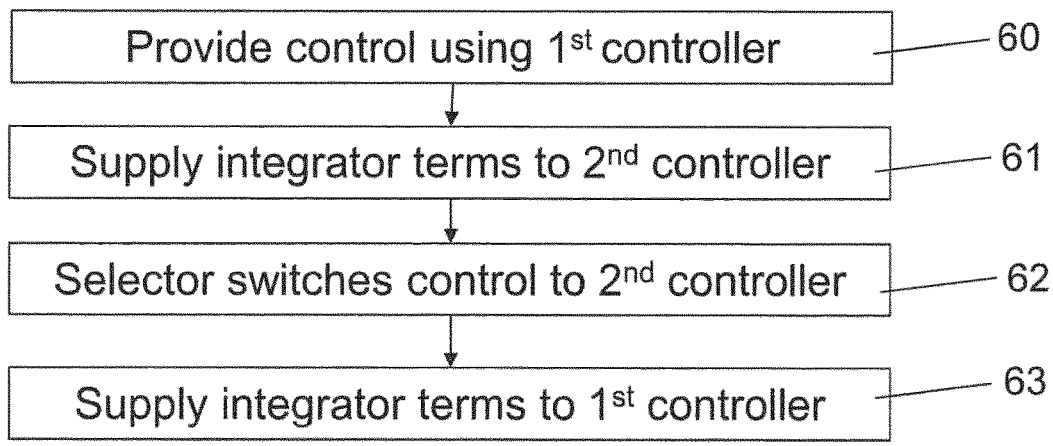
FIG. 6 shows a flow chart showing an example of the method performed by the control apparatus.

FIG. 6 shows a flow chart illustrating the method of operation of the control apparatus. Step 60 shows providing control instructions to a chain link converter using a first controller. Step 61 shows supplying, by the first controller, integrator terms to a second controller. Step 62 shows switching control such that the second controller provides control instructions to the chain link converter. Step 63 shows supplying, by the second controller, integrator terms to the first controller.

The invention claimed is:

1. A control apparatus for controlling a voltage source converter, the control apparatus comprising;
   two converter controllers, each converter controller configured to receive a measure of the output voltage and/or current from the converter and determine a control signal therefrom for controlling the converter, each converter controller including at least one integrator element configured to perform an integration operation and output an integrator term in said determination of the control signal,
a selector configured to select which one of the converter controllers provides its control signal to the converter;
wherein the or each integrator element is configured to have two modes, a first mode in which the integrator element determines the integrator term and a second mode in which the integrator term is provided by a corresponding integrator element in the other converter controller.

2. A control apparatus according to claim 1, in which each controller contains a plurality of integrator elements configured to perform an integration operation and output an integrator term for use in said determination of the control signal, wherein a subset of said integrator elements have said two modes of operation and the remaining integrator element(s) are configured to be initialised with a predetermined integrator term.

3. A control apparatus according to claim 2, in which said integrator term(s) represents an error value comprising a deviation from a set-point and said predetermined integrator term represents a zero error.

4. A control apparatus according to claim 1 in which the control apparatus is configured to provide the integrator term of the integration element in one of the controllers for initialising the integrator element of the other controller at least when switching between the controllers.

5. A control apparatus according to claim 1, in which the apparatus is configured such that on selection of one of the converter controllers by the selector to provide the control signal to the converter, its integrator element(s) is switched to the first mode from the second mode such that said integrator element(s) initiates its determination of its integrator term using the integrator term provided by the corresponding integrator element in the other converter controller.

6. A control apparatus according to claim 1, in which the apparatus is configured such that on de-selection of one of the controllers by the selector, the integrator element(s) of said deselected controller is switched to the second mode.

7. A control apparatus according to claim 1, in which the selector is configured to switch the integrator element(s) between the two modes.

8. A control apparatus according to claim 2, in which said subset of integrator elements comprises one or more of the following;
 i) an integrator element configured to provide a DC voltage control integrator term for DC voltage control in a DC outer loop control element;
 ii) an integrator element configured to provide a DC power control integrator term for DC voltage control in a DC outer loop control element;
 iii) an integrator element configured to provide a AC quadrature term for quadrature control in an AC vector control element;
 iv) an integrator element configured to provide a direct positive sequence term for use in an AC vector control element;
 v) an integrator element configured to provide a quadrature positive sequence term for use in an AC vector control element;
 vi) an integrator element configured to provide a direct negative sequence term for use in an AC vector control element; and
 vii) an integrator element configured to provide a quadrature negative sequence term for use in an AC vector control element.

9. A control apparatus according to claim 2, in which said remaining integrator elements, configured to be initialised with a predetermined value, comprise one or more of the following;
 i) an integrator element configured to provide a zero sequence term for use in an AC vector control element;
 ii) an integrator element configured to provide a quadrature zero sequence term for use in an AC vector control element;
 iii) integrator elements configured to provide a capacitor balancing term for use in calculating a capacitor balancing compensation signal in a capacitor balancing control element;
 iv) integrator elements configured to provide a differential capacitor balancing term for use in calculating a capacitor balancing compensation signal between subsets of capacitors in the converter in a capacitor balancing control element.

10. A control apparatus according to claim 1, in which the control apparatus includes a fault monitoring device for identifying a fault in the controller that supplies the control signal to the converter, the fault monitoring device configured to actuate the selector on identification of a fault to select the other controller.

11. A control apparatus according to claim 1, in which the integrator element(s) form part of a proportional-integral (PI) controller or proportional-integral-derivative (PID) controller.

12. A control apparatus according to claim 1, in which each controller includes a measurement device for measuring the output of the converter.

13. A control apparatus according to claim 1, in which each controller includes a DC outer loop element for controlling DC power flow, an AC vector control element for determining an AC voltage demand signal and a module selection element for providing a switching signal to the voltage source converter, said integrator element(s) forming part of at least one of said DC outer loop element and AC vector control element.

14. A control apparatus according to claim 13, in which the selector is configured to connect the output of the module selection element of one of the controllers to the voltage source converter and disconnect the output of the other module selection element of the other controller.

15. A control apparatus according to claim 1, in which the first and second mode of the or each integrator element is controlled by an integrator output control comprising a switch configured to switch between the output of the integrator element with which it is associated and the output of the corresponding integrator element in the other controller.

16. A voltage source converter of chain link type the voltage source converter comprising:
 a control apparatus for controlling the voltage source converter, the control apparatus comprising;
  two converter controllers, each converter controller configured to receive a measure of the output voltage and/or current from the converter and determine a control signal therefrom for controlling the converter, each converter controller including at least one integrator element configured to perform an integration operation and output an integrator term in said determination of the control signal,
  a selector configured to select which one of the converter controllers provides its control signal to the converter; and wherein the or each integrator element is configured to have two modes, a first mode in which the integrator element determines the integrator term and a second mode in which the integrator term is provided by a corresponding integrator element in the other converter controller.

17. A voltage source converter according to claim 16, in which each controller contains a plurality of integrator elements configured to perform an integration operation and output an integrator term for use in said determination of the control signal, wherein a subset of said integrator elements have said two modes of operation and the remaining integrator element(s) are configured to be initialised with a predetermined integrator term.

18. A voltage source converter according to claim 17, in which said subset of integrator elements comprises one or more of the following;
   i) an integrator element configured to provide a DC voltage control integrator term for DC voltage control in a DC outer loop control element;
   ii) an integrator element configured to provide a DC power control integrator term for DC voltage control in a DC outer loop control element;
   iii) an integrator element configured to provide a AC quadrature term for quadrature control in an AC vector control element;
   iv) an integrator element configured to provide a direct positive sequence term for use in an AC vector control element;
   v) an integrator element configured to provide a quadrature positive sequence term for use in an AC vector control element;
   vi) an integrator element configured to provide a direct negative sequence term for use in an AC vector control element; and
   an integrator element configured to provide a quadrature negative sequence term for use in an AC vector control element.

19. A power transmission network, the power transmission network comprising:
   a voltage source converter of chain length type, the voltage source converter comprising:
      a control apparatus for controlling a voltage source converter, the control apparatus comprising;
         two converter controllers, each converter controller configured to receive a measure of the output voltage and/or current from the converter and determine a control signal therefrom for controlling the converter, each converter controller including at least one integrator element configured to perform an integration operation and output an integrator term in said determination of the control signal,
         a selector configured to select which one of the converter controllers provides its control signal to the converter; and
         wherein the or each integrator element is configured to have two modes, a first mode in which the integrator element determines the integrator term and a second mode in which the integrator term is provided by a corresponding integrator element in the other converter controller.

20. A power transmission network according to claim 19, in which each controller includes a DC outer loop element for controlling DC power flow, an AC vector control element for determining an AC voltage demand signal and a module selection element for providing a switching signal to the voltage source converter, said integrator element(s) forming part of at least one of said DC outer loop element and AC vector control element.

* * * * *